United States Patent Office 3,119,780
Patented Jan. 28, 1964

3,119,780
INDICATOR COMPOSITION
Achille Silvestri, Annapolis, Md., assignor to the United States of America as represented by the Secretary of the Navy
No Drawing. Filed Oct. 19, 1961, Ser. No. 146,379
2 Claims. (Cl. 252—408)
(Granted under Title 35 U.S. Code (1952), sec. 266)

The invention described herein may be manufactured and used by or for the Government of the United States of America for governmental purposes without payment of any royalties thereon or therefor.

The present invention is directed to compositions adapted to indicate the pH level of any liquid within a range; and, more particularly, is directed to an indicator for determining the alkalinity of boiler water.

Over the years various indicators have been used to indicate the alkalinity of water in the boilers of Navy ships. This water is known in the art as boiler water. Water which is fed to a boiler contains a certain quantity of scaling ions, primarily calcium and magnesium. Phosphate salts may be added to the boiler water to complex these ions into a slippery sludge, and thus prevent their adherence to heat exchange surfaces as a scale which causes overheat, and ultimate failure of the boiler tubes. To minimize such deleterious effects, the alkalinity of exemplary boiler water is kept at a level to give a pH in the order of 10.4 to 11. Experience has shown that at this alkalinity level, boiler corrosion is at about a minimum, and the reaction between phosphate and the scale formers is more complete with the resultant in a slippery nonadherent form. Obviously, the alkalinity of the boiler water has to be ascertained in order chemically to control the impurities in the water. Under conditions met aboard ships, the chemicals used for ascertaining alkalinity must remain stable for extended periods, since a ship may be away from a home port for a long period of time.

An object of the present invention is to provide a sensitive and stable indicator composition which is capable of giving a reliable color indication of alkalinity, the indication being easily discernible to an unskilled operator.

Another object of the invention is to provide dry ingredients that can be mixed aboard ship to provide a suitable alkalinity indicator for boiler water.

A further object of the invention is to provide an indicator composition that is made up of a plurality of materials that are mixed for alkalinity tests as required in small quantities for prompt use, the essential materials being severally or alternately premixed in a dry powder form so that they remain stable for any period of time between alkalinity tests.

Still another object of the invention is to provide an indicator composition which will not react with any of the usual impurities or dissolved chemicals in boiler water.

In the preferred embodiment of the invention, a dye compound is added to a pH indicator so as to provide an indicator composition providing a range of graduated sharp colors representative of pH values in the desired alkalinity range. The principal ingredients are Alizarin Yellow R, and a blue dye called "Alphazurine Indicator." The Alizarin Yellow R used in the composition is the paranitrobenzene azosalicylate sodium salt having a formula $O_2NC_6H_4NNC_6H_3OHCOONa$. The Alphazurine A is a trade name for C.I. acid blue 7 having a Color Index 42080 and formula

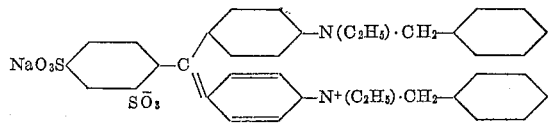

These chemical ingredients are available in powdered form. For use they are mixed in certain proportions and dissolved in distilled water. In general the composition consists essentially of a mixture, by weight, of between 65% and 75% Alizarin Yellow R and 35% and 25% Alphazurine A, and this mixture is dissolved in the water in a ratio of between .08 gram to .11 gram, but preferably of one-tenth gram, of mixture to 60 cubic centimeters of distilled water. Such an indicator solution is utilizable as an alkalinity indicator within range of pH between 10.1 and 12. A mixture of the dry ingredients within the above range which is highly satisfactory for testing the alkalinity of practically all boiler water is Alizarin Yellow R 70% and Alphazurine A 30%. This means that the dry ingredients are in a ratio of about 2.33 to 1 by weight.

When the indicator solution is added to a test sample that is a relatively acid solution, the resulting color is a readily distinguishable, clear, green color at pH of 10.1 or lower of the test sample. As the resulting solution is made more alkaline, the green changes gradually to yellow and then gradually to reddish-brown at a pH of 12. The colors are sharp and more clearly discernible than the yellow to red which the Alizarin Yellow R undergoes alone. By colorimetric means based on a comparison of calibrated or known pH colors of the indicator with that of a test sample of boiler water, the alkalinity of a test sample of boiler water, or other waters in that pH range, can be readily ascertained. A standardized color chart may be used for comparative purposes.

However, a preferred colorimetric means and method for utilizing the disclosed indicator solution in alkalinity tests for boiler water is disclosed and claimed in application Serial No. 146,380, filed currently herewith. Reference may be made to this copending application for further details of the testing procedure and use of the colorimetric means. Briefly, however, the means comprises a hollow rectangular box or container with a pair of parallel transparent sides and a single transparent diagonal partition dividing the box into two triangular compartments. One compartment is filled with a relatively acidified solution of the indicator solution that provides a green color for a solution with a pH of 10 or lower. The other compartment is filled with a relatively alkalized solution that provides a reddish-brown color for a solution with pH of 12 or more. A continuous spectrum of smoothly changing colors between the green and reddish-brown is obtained along the length of the container, which can be viewed perpendicularly through the transparent sides and partition of the container.

A transparent cell or box with a test sample of boiler water containing indicator solution is color-matched to a position of the spectrum, and the position of the cell with respect to the container indicates the pH value of the sample. Preferably a pH scale is marked on the container and extends for its viewable length. The position of the sample on this scale can then be read directly as a pH value.

The standardized acidic solution for one compartment of the container may be in proportions equivalent to 100 cubic centimeters of boiler water to which has been added and dissolved six-tenths of a gram of monosodium phosphate ($NaH_2PO_4$) and 1 cubic centimeter of indicator solution. The ingredients may be initially mixed by shaking in a clean container or flask, and then the solution poured into the compartment. This provides a pH of less than 10 and has a green color.

The standardized alkalized solution for the second compartment of the container may be in proportions equivalent to 100 cubic centimeters of boiler water to which has been added one-half cubic centimeter of a 50 percent solution of sodium hydroxide (NaOH) and 1 cubic centimeter of indicator solution. The ingredients may be initially mixed by shaking in a clean container or flask, and then the solution poured into the second compartment. This provides a pH of higher than 12 and has a reddish-brown color.

The standardized solutions may be made with distilled or other suitable water, if desired; but the same source of water is preferred for the standardized solutions and test sample.

For the color comparison, the test cell contains boiler water and indicator solution mixed in the proportions of 100 to 1, as for example 100 cubic centimeters of boiler water to one cubic centimeter of indicator solution.

An important advantage of the invention resides in the fact that the ingredients for the indicator composition, and the different standardized and test solutions for conducting a test can be mixed and compounded shortly before a test is made. When so used, variations in the ingredients' reactive properties automatically neutralize on the color comparison.

An alternate dye for Alphazurine A is Alphazurine indicator which is a trade name for C.I. acid blue 9 having a Color Index of 42090 and formula is

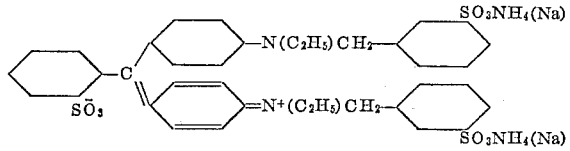

The Alphazurine indicator is used in the same quantity and proportions in the invention as is Alphazurine A.

Although the invention has been described in its preferred forms, the invention is not limited thereto as slight changes in the proportions of the ingredients named herein within the limts set forth may be made with good results. The presence of small amounts of inert constituents, other than dyes, does not adversely affect the indicator.

Obviously many modifications and variations of the present invention are possible in the light of the above teachings. It is therefore to be understood that within the scope of the appended claims the invention may be practiced otherwise than as specifically described.

What is claimed is:

1. A composition for indicating the alkalinity of boiler water solutions, consisting essentially of a dry mixture of Alizarin yellow R and Alphazurine, the ratio of Alizarin yellow R to Alphazurine being about 2.33 to 1 by weight dissolved in water in proportions equivalent to one gram of the mixture to 600 grams of water, the color thereof being green and changing gradually to yellow and then changing gradually from yellow to reddish-brown in the range of pH of 10.1 to 12.

2. A composition for indicating the alkalinity of boiler water solutions consisting essentially of a dry mixture of Alizarin yellow R and Alphazurine the color thereof being green and changing gradually to yellow and then changing gradually from yellow to reddish-brown in the range of pH 10.1 to 12, the compounds being dissolved in water in the following proportions:

| | Percent |
|---|---|
| Alizarin yellow R | 70 |
| Alphazurine | 30 |

References Cited in the file of this patent

UNITED STATES PATENTS 2,663,692    Corso et al. _____ Dec. 22, 1953

OTHER REFERENCES

Kolthoff et al.: "Acid-Base Indicators," copyright 1937 by the Macmillan Co., New York, N.Y. Copy in Div. 64, pages 148–175.

National Pharmaceuticals, pub. by National Aniline Div. of Allied Chem. and Dye Corp., New York, N.Y. (price list—1950), (copy in Div. 64), page 51.

Tomicek: Chemical Indicators, Butterworths Scientific Publications, London, 1951, pages 160 and 175 (available in Sci. Lib.).